United States Patent [19]

Stuth

[11] Patent Number: 5,202,027
[45] Date of Patent: * Apr. 13, 1993

[54] SECONDARY SEWAGE TREATMENT SYSTEM

[76] Inventor: William L. Stuth, 28620 Maple Valley Highway S.E., Maple Valley, Wash. 98038

[*] Notice: The portion of the term of this patent subsequent to Jul. 9, 2008 has been disclaimed.

[21] Appl. No.: 724,836

[22] Filed: Jul. 2, 1991

Related U.S. Application Data

[63] Continuation-in-part of Ser. No. 559,427, Jul. 23, 1990, Pat. No. 5,030,353, which is a continuation of Ser. No. 297,294, Jan. 13, 1989.

[51] Int. Cl.$^5$ .............................................. C02F 3/06
[52] U.S. Cl. ........................... 210/615; 210/618; 210/629; 210/151; 210/197; 210/282
[58] Field of Search ........... 210/150, 151, 220, 221.2, 210/537, 615, 617, 618, 629, 282, 541, 197

[56] References Cited

U.S. PATENT DOCUMENTS

| | | | |
|---|---|---|---|
| Re. 26,716 | 11/1969 | Cirrincione | 210/282 |
| 877,569 | 1/1908 | Joseph | 210/150 |
| 3,412,864 | 11/1968 | Okada | 210/151 |
| 3,879,292 | 4/1975 | McClive | 210/282 |
| 4,039,437 | 8/1977 | Smith et al. | 210/617 |
| 4,810,377 | 3/1989 | Kato et al. | 210/150 |
| 4,933,076 | 6/1990 | Oshima et al. | 210/151 |
| 4,995,980 | 2/1991 | Lambert | 210/617 |
| 5,030,353 | 7/1991 | Stuth | 210/615 |

FOREIGN PATENT DOCUMENTS

| | | |
|---|---|---|
| 52-122997 | 1/1981 | Japan . |
| 59-19584 | 2/1984 | Japan . |
| 62-279888 | 12/1987 | Japan . |

Primary Examiner—Stanley S. Silverman
Assistant Examiner—Christopher Upton
Attorney, Agent, or Firm—Harry M. Cross, Jr.

[57] ABSTRACT

A secondary sewage treatment system is provided with vertically-aligned foam collecting, turbulent, mixing, settling, and sludge collecting zones. A grating defines the boundary between the turbulent and mixing zones. Beneath the grating, a buoyant media, such as hollow plastic spheres, are contained and occupy substantially all of the mixing zone. Air diffusers including elongated draft tubes extend from the turbulent zone down through the mixing zone for introduction of air to aerate waste water liquor and to cause the aerated liquor to recirculate up into the turbulent zone, thereby creating a circulation of waste water liquor from the turbulent zone, down through the mixing zone and around the buoyant media, and up through the draft tubes to the turbulent zone.

22 Claims, 6 Drawing Sheets

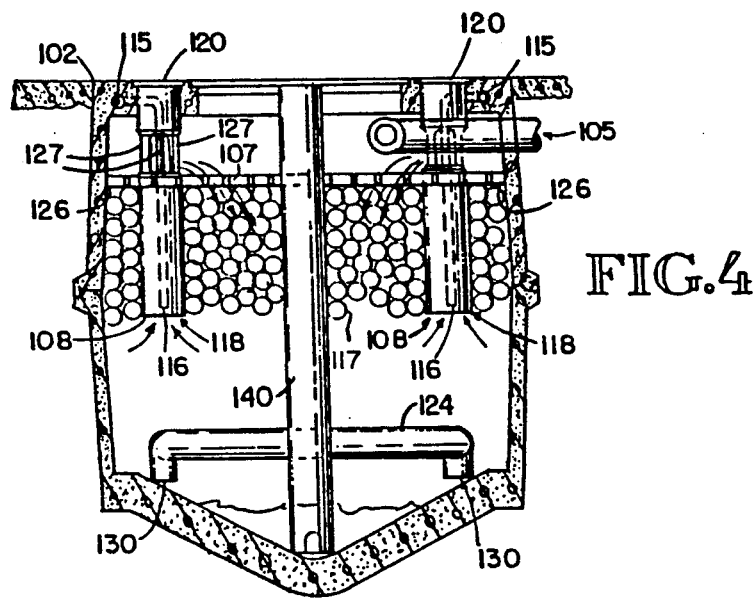
FIG.4
FIG.5
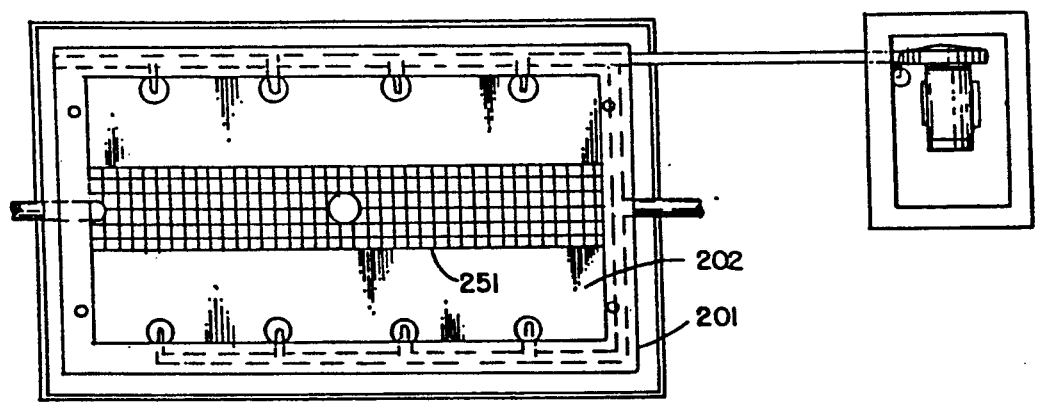

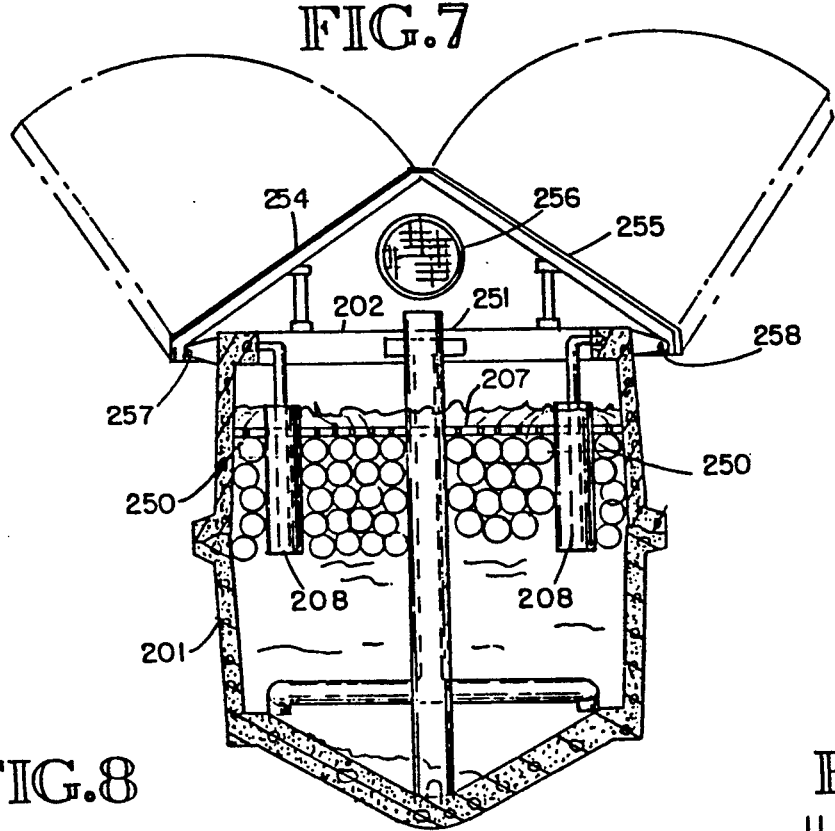
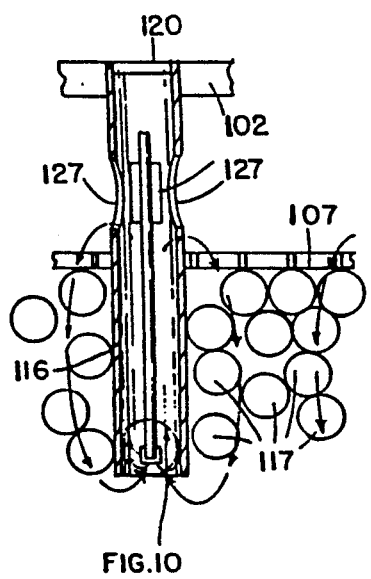
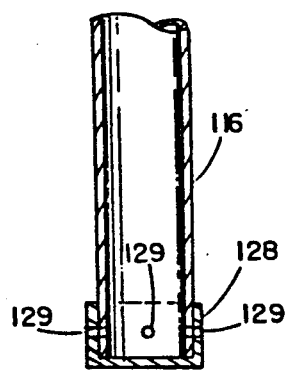
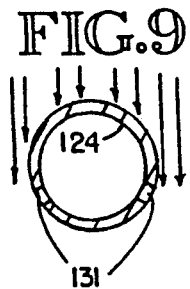

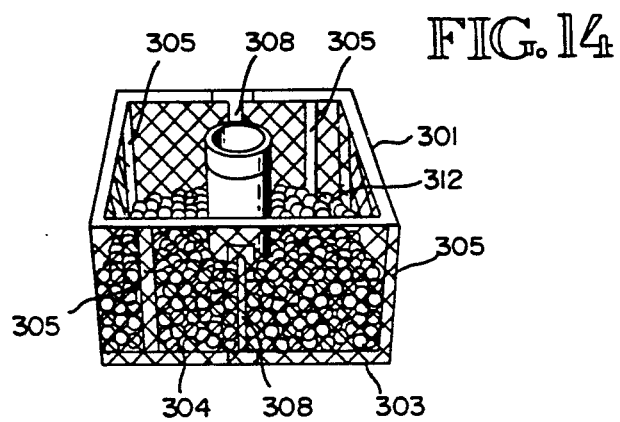
FIG. 14
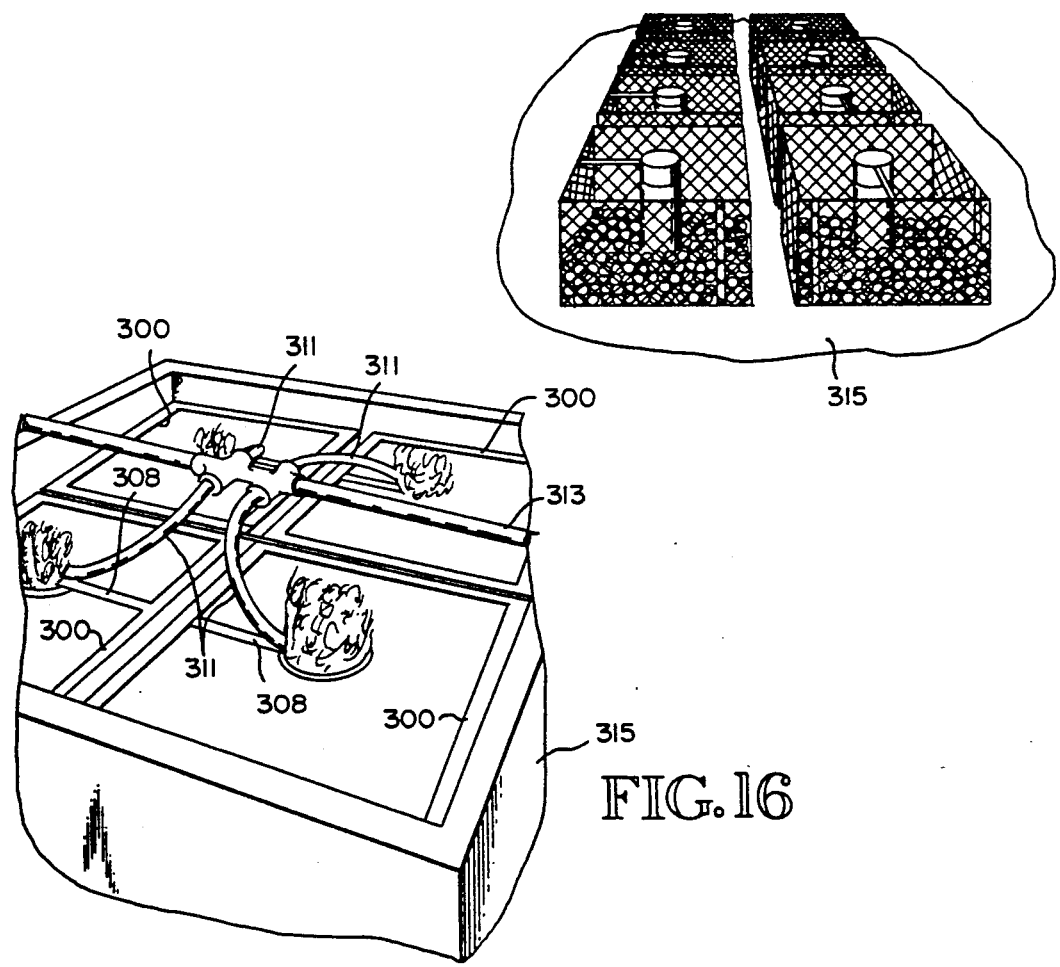
FIG. 15
FIG. 16

SECONDARY SEWAGE TREATMENT SYSTEM

RELATED APPLICATION

This application is a continuation-in-part of application Ser. No. 07/559,427, filed Jul. 23, 1990, now U.S. Pat. No. 5,030,353; the latter being a continuation of application Ser. No. 07/297,294, filed Jan. 13, 1989.

FIELD OF THE INVENTION

This invention relates to on-site waste water treatment systems, and more particularly to secondary treatment systems.

BACKGROUND OF THE INVENTION

On-site disposal of waste water (sewage) from single family residences and commercial establishments in areas with no conventional sewer system has conventionally been accomplished by a septic tank system. The anaerobic effluent discharged from the septic tank, after settling of the solids portion of the incoming waste water, is passed into a subsurface drain field for percolation into the surrounding soil. Such a system works satisfactorily if properly installed and if proper soil conditions for disposal of the effluent by the drain field exist. While most residential septic systems work with harmony between the septic tank and drain field, there are increasing numbers of drain field failures in commercial systems. Commercial systems where food preparation wastes are involved are particularly susceptible to failure. The high strength and grease content related to food preparation is beyond the capacity of the conventional septic system.

In such systems, heretofore, small treatment plants which make use of chemical and/or biological treatment schemes to render the effluent suitable for disposal have been suggested. These treatment plants usually are designed to replace the conventional septic system. Such treatment plants are generally prohibitively expensive to and generally not economically feasible for treatment of commercial sewage, as from restaurants, in rural and semi-rural areas.

SUMMARY OF THE INVENTION

A primary object of the present invention is to provide a secondary sewage treatment system intended to operate in conjunction with a conventional septic system. The system of this invention is designed to be interposed between the septic tank and drain field to provide a satisfactory effluent to the drain field. In particular, the present system is specially designed for use in commercial treatment systems that must handle food preparation wastes; and in this environment the system provides an effluent comparable to that which would be produced from a conventional residential septic tank.

Generally speaking, the system of this invention biologically treats biodegradable wastes through aerobic microbial growth on media resulting in the biological oxidation of the waste products. The applied waste water settles from the active aerobic zone, in which the media is contained, to an underlying anoxic treatment zone; and sludge settles to a still lower anaerobic zone. The preferred embodiment of this invention functions as an aeration tank, settling tank and aerobic digester in a singe unit. This invention uses buoyant media, as contrasted with fixed or packed media, and consequently does not incur flocculent build-up during operation or the consequent clogging typical of fixed or packed media treatment systems. In the present invention, biological growth takes place in a mixing zone filled with a buoyant media. The buoyant media has a high surface area to volume ratio, a low resistance to liquid flow and a surface condition receptive to aerobic microbial growth. A preferred system incorporates a series of modular media-containing cages or baskets that float in the wastewater undergoing treatment within a mixing zone.

Waste flow from a septic tank enters the system into a turbulent zone above the mixing zone and begins a continuous cycle, flowing down through the mixing zone and then upward through draft tubes from which it is re-introduced to the turbulent zone. The mixing zone is filled with the buoyant media and the waste flows gently down through the mixing zone in contact with the buoyant media surfaces. The draft tubes are free of buoyant media or any other surfaces on which biomass can collect. The waste liquor is drawn turbulently up through the draft tubes and spills out above the mixing zone into the turbulent zone. The turbulent zone is likewise free of buoyant media or any other surfaces on which biomass can collect.

Within the turbulent zone, the boiling action of the liquor, including detergents and other foaming products, produces a foam which accumulates in the area immediately above the turbulent zone. This foaming action provides additional treatment action, with bacteria being evident in the foam, and also enables the system to tolerate occasional overloading such as occurs during peak hours of operation in food service establishments. When overloaded, the system produces more foaming, in which a significant amount of suspended solids and grease and oils are held, thereby delaying treatment of these wastes until the system can tolerate them; at which time the foam settles through the turbulent zone into the mixing zone and is incorporated in the waste liquor.

The system provides an anoxic settling zone below the mixing zone through which sludge may settle out for separate removal and from which the treated liquor effluent may be discharged into the drain field. The treated liquor is collected through a manifold positioned midway between the bottom of the mixing zone and the top of the sludge-collecting zone. It then flows through a riser into an outlet leading to the septic system drain field.

BRIEF DESCRIPTION OF THE DRAWINGS

FIG. 4 is a cross section view taken along the line 4—4 in FIG. 2;

FIG. 5 is a top plan view of another embodiment of the apparatus of this invention;

FIG. 7 is a cross section view taken along the line 7—7 in FIG. 5;

FIG. 8 is a detailed view of the draft tube segment of the FIG. 2 apparatus;

FIG. 9 is a detailed view of the effluent outlet manifold of the FIG. 2 apparatus;

FIG. 10 is a partial view of the air discharge tube employed in the FIG. 8 draft tube segment;

FIG. 14 is another isometric view of a cage similar to the FIG. 11 cage but having a different cage framework construction;

FIG. 15 is a partial view of a series of FIGS. 11 & 14-type cages arranged on the floor of a treatment vessel; and FIG. 16 is a partial view of a series of FIGS. 11 & 14-type cages floating and in operation within a treatment vessel.

DETAILED DESCRIPTION OF THE INVENTION

The on-site waste water treatment system as herein described may be used for treatment of residential or commercial wastes. However, its primary intended use is for treating commercial wastes which ordinarily cannot be treated with conventional septic systems. The typical effluent from residential and commercial business establishments consists primarily of human waste in admixture with biodegradable materials such as food and other materials associated with food preparation. The waste water to be treated generally contains gravity settleable solids. While any means of effecting solid-liquid separation may be used, the most commonly used method is a septic tank into which the waste water is discharged and the solids allowed to settle by gravity. The effluent leaving the septic tank, or other settling system, is directed into the system of the present invention.

Figure 1:
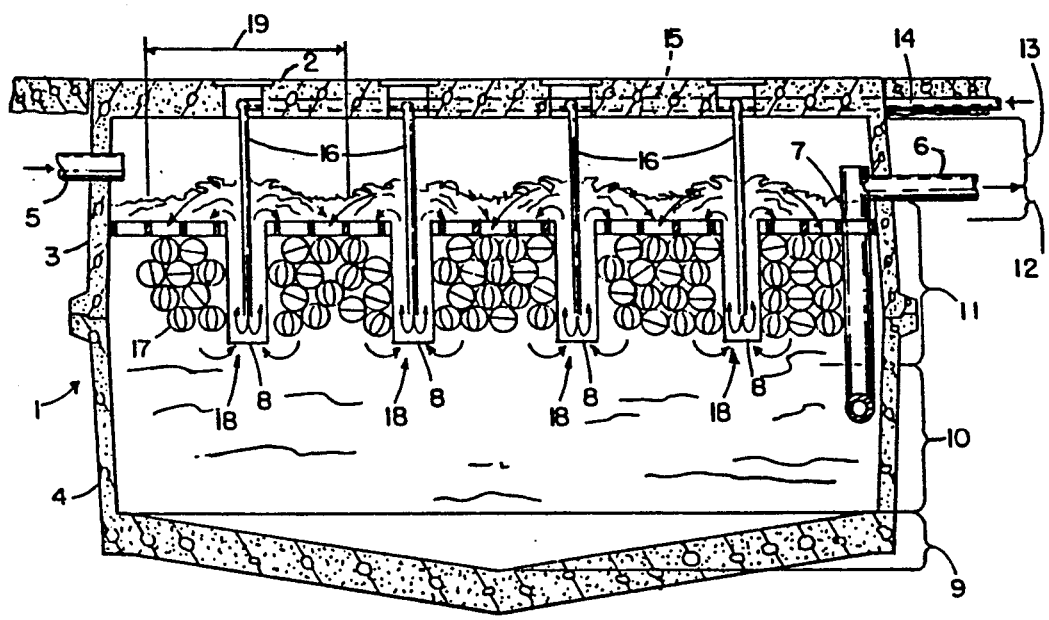
FIG. 1 is a vertical side elevation view, in cross section, of an exemplary embodiment illustrating the principals of operation of the system of this invention.

As shown in FIG. 1, the system of the present invention is provided in a concrete tank 1. The tank 1 has a lid 2, and upper and lower halves 3 and 4. Within the upper half 3, waste influent inlet 5 and waste liquor outlet 6 are provided. Below the level of the inlet and outlet, a grating 7 is provided that extends across the area of the tank interior, from wall-to-wall. A plurality of draft tubes 8 are located and positioned in the tank such that they open at the top co-planar with the top surface of the grating 7 and extend down into the tank to open at their lower ends a distance below the grating 7. The bottom of the tank 1 is sloped to provide a centralized low point. This structure provides an anaerobic sludge-collecting zone 9 at the bottom of the tank, an anoxic settling zone 10 extending above the sludge-collecting zone, a media mixing and aerating zone 11 extending above the settling zone and generally defined by the length of draft tubes 8 inasmuch as it extends from just below the bottom ends of the draft tubes to the grating 7, a turbulent zone 12 extending from the grating 7 to the elevation of the influent inlet 5, and a foam-collecting zone 13 above the turbulent zone 12. An air delivery conduit 14 delivers air via a manifold 15 embedded in the tank lid 2 to individual air delivery tubes 16, one being provided for each draft tube 8. The air delivery tubes 16 extend axially down into the draft tubes 8 and terminate above the bottom end of each respective draft tube. A multiplicity of buoyant media, such as spheres 17, are contained within the tank below the grating 7. When the systems is filled with waste fluid and operational, the tank 1 is filled with waste fluid up to the level of the outlet 6. The buoyant media 17 float and are confined beneath the grating 7 within the media mixing and aerating zone 11; zone 11 being essentially filled with the media 17. The media are preferably composed of buoyant hollow plastic spheres that provide a high surface area to volume ratio on the order of 38 sq. ft./cu. ft. or more.

Each draft tube - air delivery conduit assembly comprises an air diffuser 18 through which air is ejected into the system without disturbing the surrounding media mixing and aerating zone 11. During operation of the system, influent entering the tank 1 is circulated through the media 17 by the pumping action of the air diffusers 18. As air is discharged into the draft tubes 8, it aerates the liquor within the draft tubes as it rises. The waste liquor is churned and pumped along with the rising air up and out of the draft tubes into the turbulent zone 12.

As waste influent enters the system, the liquor flows gently down through the mixing zone 11, passing through the buoyant media 17 (i.e. around the individual spheres that make up the media). From the bottom of the mixing zone 11, the liquor passes vertically through the separate passageways, provided by the draft tubes 8, between the bottom and top of the mixing zone 11. The air forced into the draft tubes induces a pumping action while aerating the liquor passing upward in the draft tubes. Unlike the gentle flow in the mixing zone 11, the flow within these vertical passageways is relatively turbulent. The volume of air used and the proximity of the vertical flow passageways is such that the outlet circles 19 of flow turbulence between adjacent draft tubes overlap. Consequently, the liquor is continuously circulated in a flow path, including the mixing zone 11 and the vertical flow passageways, at a flow rate and under conditions suitable for promoting thorough mixing of the liquor with the buoyant media, and suitable for maintaining aerobic microbial growth on the buoyant media. If the flow rate of the liquor through the mixing zone 11 is too turbulent, microbial growth will be washed off the buoyant media. On the other hand, if the flow rate through the buoyant media is too slow, excessive microbial growth will accumulate and may cause clogging. When the flow rate is correct, excessive microbial growth falls off the buoyant media and is naturally recycled. Because the media is not fixed or packed, the individual buoyant elements that make up the buoyant media can rotate and tip over as growth builds up. The buoyant media is thus self- cleaning. Dead growth will fall from the buoyant media and settle through the settling zone 10, forming sludge in the sludge-collecting zone 9. Periodically the sludge may be pumped out and discarded or recycled.

Figure 2:
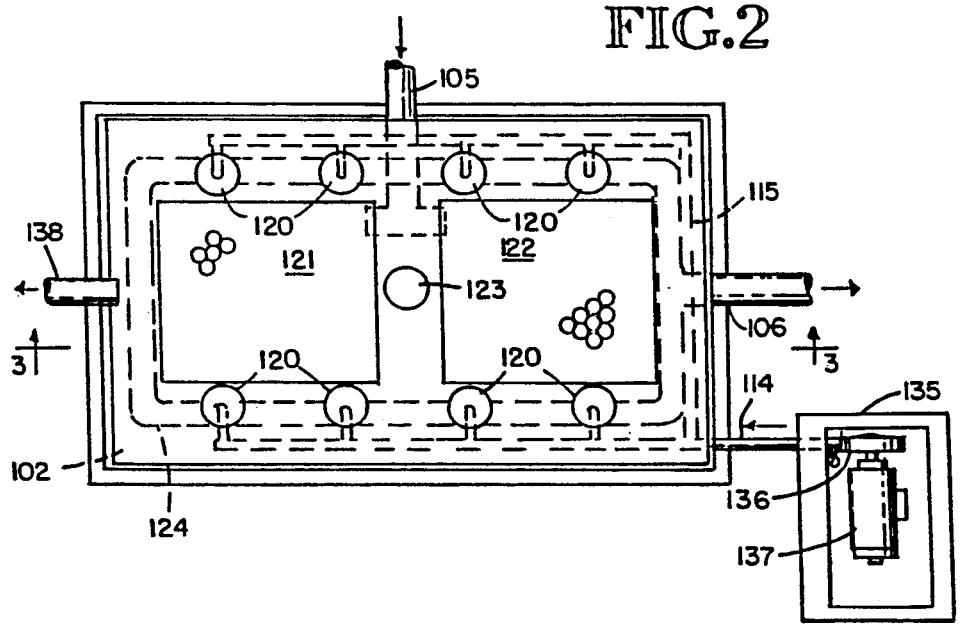
FIG. 2 is a top plan view of a preferred embodiment of the apparatus of this invention.
Figure 3:
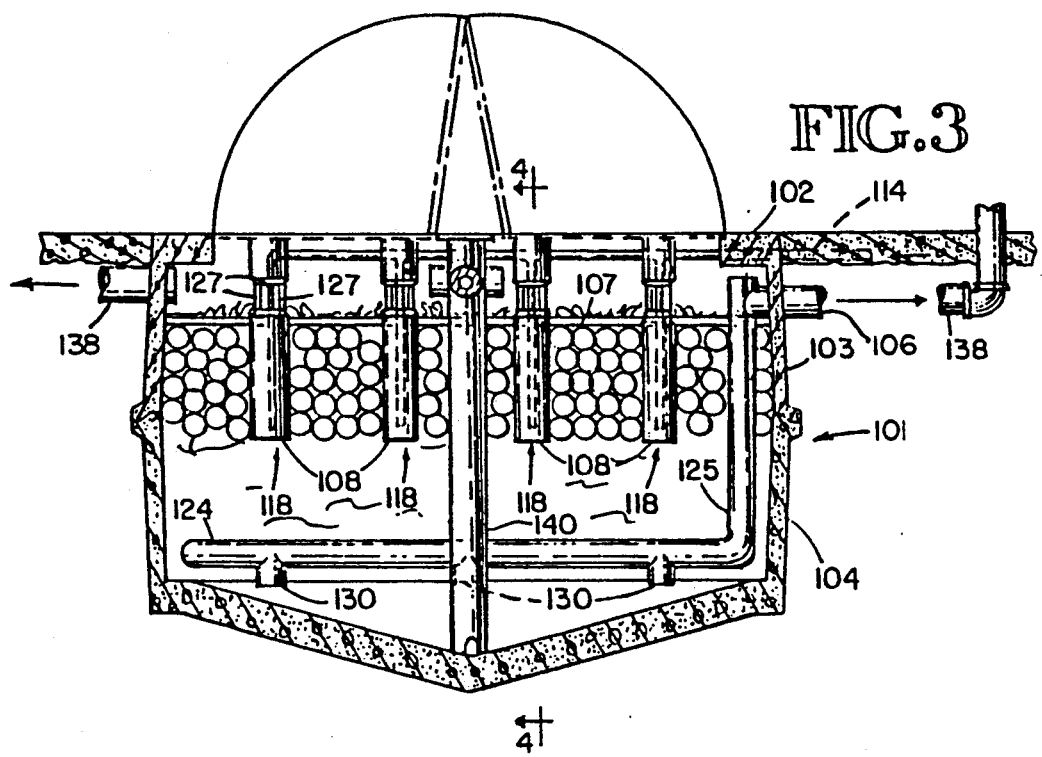
FIG. 3 is a cross section view taken along the line 3—3 in FIG. 2.
Figure 6:
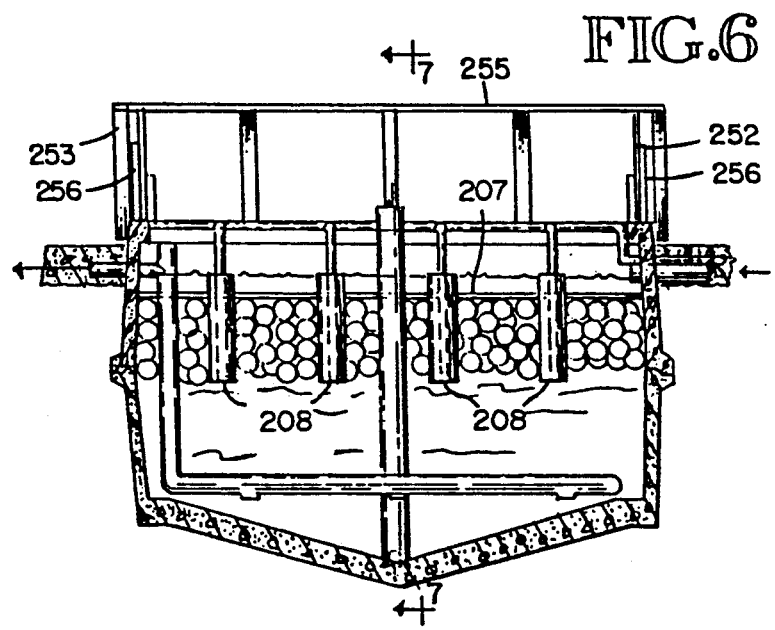
FIG. 6 is a cross section view taken along the line 6—6 in FIG. 5.

One preferred embodiment that incorporates the features of the FIG. 1 system and functions in accordance with the description of the FIG. 1 system is shown in FIGS. 2-4. A similar system is shown in FIGS. 5-6.

Another preferred embodiment provides a series of modular media-containing cages or baskets, rather than an integral, or built-in, mixing zone structure. The modular cage feature, as shown in FIGS. 11-16, functions in the same manner and in accordance with the same principles as the FIG. 1 system heretofore described.

With reference to FIGS. 2-4, this embodiment comprises a cast concrete tank 101 having top and bottom halves 103 and 104 joined at a circumferential seam, and a lid 102. The lid is provided with a plurality of air diffuser openings arranged in two rows, each opening being closed by a traffic-bearing clean-out cover 120, and a pair of access openings located between the two rows of air diffuser openings. The access openings are closed by traffic-bearing steel doors 121–122. The access openings are separated by a mid-span lid portion that contains a sludge pump-out opening closed by a traffic-bearing clean-out cover 123.

An influent inlet conduit 105 enters from the side of the tank 101 and branches at a Tee toward the center of the tank to provide two influent discharge openings into the tank's interior. An effluent discharge conduit 106 enters from one end of the tank 101 and is connected to a liquor-collecting manifold 124 by a riser 125. Manifold 124 is located between the bottom of the settling zone and the top of the sludge-collecting zone.

A grating 107 is positioned within the tank's interior and fastened to the tank inner wall by brackets 126. The grating 107 is positioned just below the elevation of the outlet conduit 106 as shown. Axially below the air diffuser openings, the grating 107 is provided with apertures for the draft tubes 108. Draft tubes 108 are provided that extend from the lid air diffuser openings and downward through the grating 107 into the tank's interior. The draft tubes are secured to the lid at their respective lid openings and stabilized by the grating 107. Each draft tube is provided with longitudinal cut-out openings 127 in it's side wall, above the grating 107, that span the turbulent zone's depth to provide for liquor flow from the draft tube interiors into the turbulent zone. An air inlet conduit 114 connects to a manifold conduit 115 embedded in the tank lid. Individual air delivery tubes 116 are connected to the manifold conduit 115 and extended down into the draft tubes to provide, in conjunction with the draft tubes, the multiple air diffuser assemblies 118 required by this invention. As shown in FIG. 10, the bottom end of each air delivery tube 116 is capped and provided with radial apertures 129 through the cap 128 and the tube wall for discharge of air into the draft tube passageway. This capped feature prevents buoyant media elements from accidentally becoming lodged in the draft tubes, as might tend to occur while the tank is being filled for example. As in FIG. 1, the mixing zone is substantially filled with the buoyant media elements 117.

The bottom outlet manifold conduit 124 is provided with several downward-opening inlets 130 as shown in FIGS. 2 and 3. These large openings prevent the manifold from becoming anaerobic. Along the length of the manifold conduit, moreover, the semi-clarified effluent liquor passes through a plurality of apertures 131. These apertures, as shown in FIG. 9, are located below the mid-line of the manifold conduit so that settling particulates will not fall into the apertures.

Air is supplied to the system by air pumping system 135, comprising a fan 136 and an air pressure and volume regulator 137. Excess air is vented from the tank 107 through air vent conduit 138 extending into the foam collecting zone.

A sludge removal conduit 140 extends downward from the top lid clean-out opening to the bottom of the tank for removal of sludge from the sludge-collecting zone. Side openings are provided in the bottom removal conduit 140, as shown in FIGS. 3 and 4 to facilitate sludge removal.

A 1680 gallon tank sized as shown in FIGS. 2–4 would conveniently hold 100 cubic feet of 3.5 inch diameter Jaeger Tri-Pak Polypropylene media elements. This media has a ratio of 38 square feet of area per cubic foot of volume. This would yield 3800 square feet of media area. Compressed air could be supplied by a 2.5 horsepower Gast model R5125-1 fan at 160 cfm free air. A unit of this capacity could handle 700 gallons of waste water from a restaurant per day and yield household-type effluent to the drain field after a 58 hour retention time at maximum hydraulic capacity. If lower waste strength is desired, the unit could be operated at a lower flow rate or two such units could be connected in series between the septic tank and the drain field. This unit has demonstrated that it has the capacity to cope with shock loading, whether due to increases in waste strength or hydraulic loading or both. In normal operation, the unit does not accumulate sludge in the sludge-collecting zone and there will be little or no need for periodic pump outs.

The embodiment shown in FIGS. 5–6 is similar in most structural respects to the FIGS. 2–4 embodiment. In this embodiment, however, the grating 207 and the draft tubes 208 are supported in a different manner within the tank 201. Also, the draft tubes 208 do not extend above the turbulent zone inasmuch as they are supported from below, rather than from the overhead tank lid as in the FIGS. 2–4 embodiment. In the present embodiment, the grating 207 is supported on brackets 250 that also extend inward to enclose one of the draft tubes 208 at their outer ends, as shown in FIG. 7. Also in this embodiment, the tank lid is configured differently. The lid is provided with a longitudinal rectangular maintenance opening covered by a non-metallic walkway cover 251. A tank cover having a pair of triangular end walls 252 and 253, and with hinged panels 254 and 255 that overlap at their apex to form a weather-tight roof. The end panels are vented at 256 so that excess air from the tank 207 can escape through the walkway 251 to the atmosphere. Roof mounting hinge sets 257 and 258 are attached to tank 207 as shown in FIG. 7. The roof structure may be made of light weight material such as fiberglass so that installation is convenient.

Figure 12:
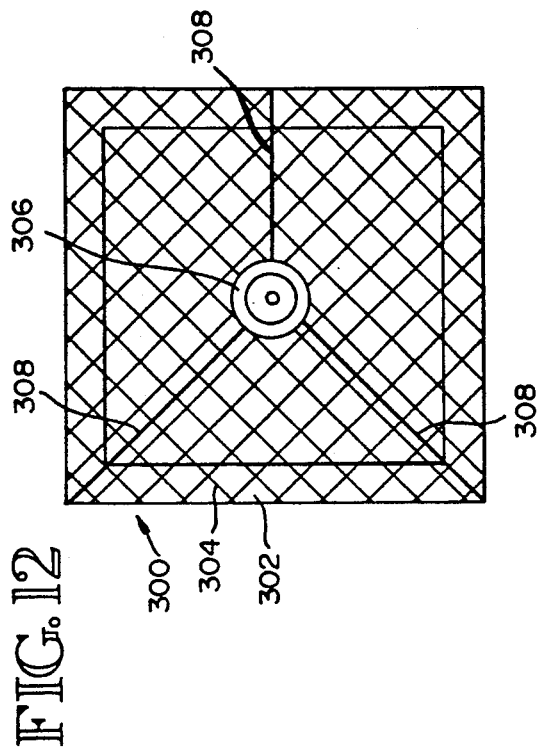
FIG. 12 is a top plan view of the FIG. 11 cage.
Figure 13:
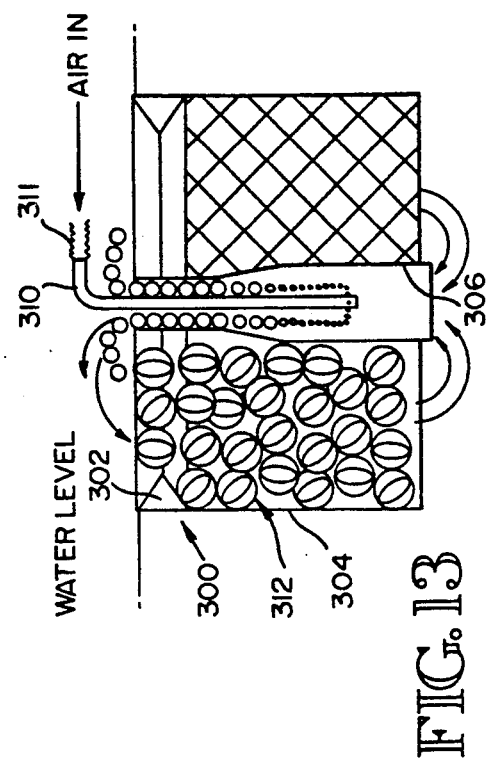
FIG. 13 is a side view of the FIG. 11 cage, illustrating the mixing action of the process within an individual cage.
Figure 11:
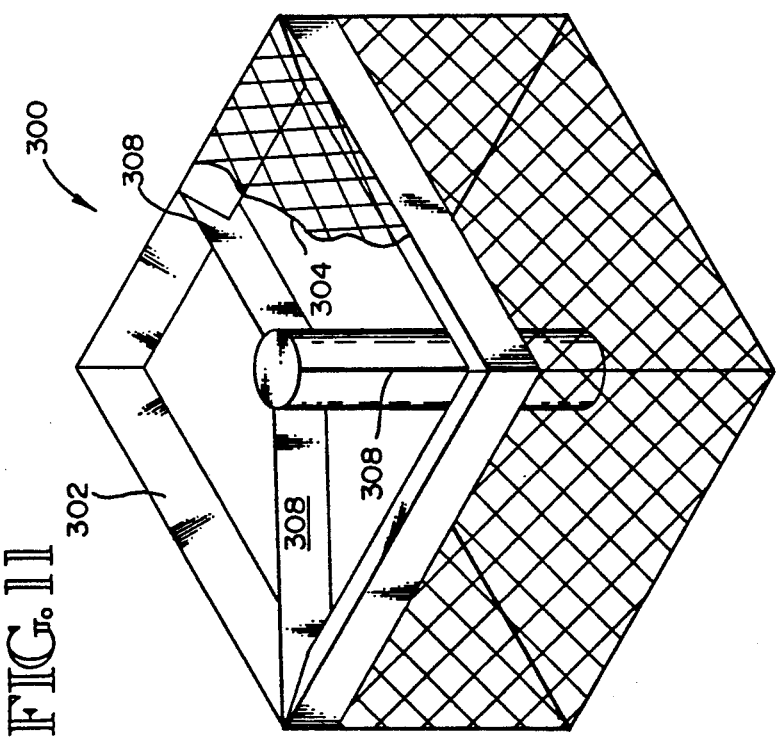
FIG. 11 is an isometric view of a preferred media-containing cage or basket which may be used in place of the integral structure shown in FIG. 1.

With reference to FIGS. 11–12, the media cage or basket 300 comprises a frame such as the top flotation ring 302, a media-containing screen 304 that covers all sides of the cage 300, a draft tube 306 centered in the cage and supported therein such as by cross-bracing 308 from ring 302, an air delivery tube 310 extending into the draft tube 306, and buoyant media 312. The draft tube 306 extends at least through the top and bottom surfaces of the screen covering 304, and may extend slightly above and below these screen surfaces. In FIG. 11, the media screen surface across the top of the cage is broken away for the purpose of better revealing the support structure for the draft tube 306. In FIG. 13, the media screen is broken away from the central and left-hand portions of the view for the purpose of better revealing the presence of the buoyant media and the cross-section of the draft tube configuration.

The media cage screen covering may have structural strength sufficient to be self-supporting such that only the framework 302 shown in FIG. 11 will be sufficient. Alternately, as shown in FIG. 14, the framework may be provided in the form of top and bottom rectangular frames 301, 303 connected by at least one vertical strut 305 per side, and the screen covering may be provided as a flexible mesh. In either case, the screen covering has an open mesh configuration small enough to retain the media and large enough to enable sloughed bio-mass to pass through. The upper surface of the screen covering provides the same function as the grating 7 in the FIG. 1 system, the wastewater flowing therethrough and translating from a turbulent state into a free-flowing non-turbulent state required for passage through the floating media. The draft tube 306 may be cylindrical, as shown in FIG. 11, or may have a venturi-tube configuration, as shown in FIG. 13. The air delivery tube 310 may be provided with a flexible coupling member 311, as shown in FIG. 13, for coupling to an air delivery manifold 313 as shown in FIG. 16.

In FIG. 16, four of the FIG. 14-type cages are shown floating in a treatment vessel 315 with the air delivery manifold extended across the top of the vessel 315 and with four flexible couplings 311 connecting the manifold with the air delivery tubes. In operation, as heretofore described and shown with reference to FIG. 1, aerated wastewater flows turbulently out of the top of each draft tube as illustrated in FIG. 16 and is distributed across the surface of the four cages. The so-called turbulent zone is that zone between the top surface of the cages and the top of the treatment vessel casing wall. Appropriate wastewater inlet and outlet conduits are provided for the treatment vessel, but are not shown in FIG. 16.

As shown in FIG. 15, several cages may be arranged to fit any particular treatment vessel configuration. They may be installed on the vessel floor, as shown, and then connected to the air delivery system. Wastewater may then be charged into the vessel to float the cages and then the system process started. The cages need not be secured to the treatment vessel nor to one another, although they may be is so desired.

The aeration modules of the FIGS. 11-16 type may be used in any treatment process configuration, if desired. There are particular advantages in using them in the FIG. 1 type of processing system, but other processes can benefit from use of these modular aeration structures. Any treatment system wherein unstable waste loading can degrade the treatment process effectiveness can benefit from the installation of these modular aeration structures.

The FIGS. 11-16 cages shown may be 32 inches square and 22 inches high. The framework may be constructed of plastic or fiber glass material. The screen covering may also be constructed of plastic or fiber glass material. The draft tube for each cage may be supported from the top, as shown in FIG. 11, or from the top and the bottom as shown in FIG. 14.

In summary:

A secondary sewage treatment system is provided with vertically-aligned foam collecting, turbulent, mixing, settling, and sludge collecting zones. A grating defines the boundary between the turbulent and mixing zones. Beneath the grating, a buoyant media, such as hollow plastic spheres, are contained and occupy substantially all of the mixing zone. Air diffusers including elongated draft tubes extend from the turbulent zone down through the mixing zone for introduction of air to aerate waste water liquor and to cause the aerated liquor to recirculate up into the turbulent zone, thereby creating a circulation of waste water liquor from the turbulent zone, down through the mixing zone and around the buoyant media, and up through the draft tubes to the turbulent zone.

While the preferred embodiments of the invention have been described herein, variations in the design may be made. For example, various feature of the two embodiments described herein may be substituted for one another or combined, as appropriate. As another example, the secondary treatment system apparatus of this invention might be incorporated into a combination treatment tank that would have a first section that would function as a conventional septic tank and a second section that would function in accordance with the principles described herein. The scope of the invention, therefore, is only to be limited by the claims appended hereto.

The embodiments of the invention in which an exclusive property is claimed are defined as follows:

1. In a secondary treatment system which comprises a treatment tank having bottom and side walls, and an influent inlet and an effluent outlet so constructed and arranged whereby an operating liquid treatment surface elevation will be established in the upper region of the tank during operation of said system:

a plurality of buoyant aeration cages each comprising a framework, a media-containing open mesh covering having a multiplicity of openings therethrough, said covering being supported by said framework and so constructed and arranged to provide a completely enclosed open mesh cage having open mesh top, side and bottom surfaces; said aeration cages being so constructed and arranged relative to said tank whereby they will float with their respective top surfaces generally coplanar and located near the operating liquid treatment surface elevation when said system is charged with wastewater for treatment and whereby they will provide a subdivision of said tank into (a) a treatment section located above their top surfaces and (b) a mixing section located below their top surfaces and within said open mesh cages and (c) a settling zone located between their bottom surfaces and the bottom wall of said tank; a plurality of air diffuser means, each air diffuser means including an elongated draft tube mounted to and supported by an aeration cage framework and means for supplying air into said draft tube, said draft tube extending between its respective aeration cage top and bottom surfaces and having openings for circulation of waste water liquor upwardly therethrough during operation of said system, said air diffuser means being so constructed and arranged with respect to said aeration cages that media elements confined within said aeration cages are prevented from escaping the aeration cages and entering said draft tube; a multiplicity of buoyant media elements to support biomass contained within each of said aeration cages that will float in waste water liquor beneath the top surfaces of said open mesh cages during operation of said system, the mesh size of the cage coverings being small enough to prevent media elements from escaping from their cages and large enough to permit sloughed-off bio-mass to pass through the cage coverings into the settling section of said tank;

air delivery means comprising distribution means for supplying air to said system; a plurality of flexible coupling conduits, each connected in fluid communication with said air distribution means and with one of said draft tube air supply means, whereby said aeration cages may be floated into operative position when said system is charged with wastewater for treatment and whereby air may be supplied from said air distribution means simultaneously into each draft tube during operation of said system.

2. The system of claim 1 wherein said cage comprises a framework and cross bracing extending from said framework to said draft tube to support said draft tube with said cage; said covering being attached to said framework.

3. The system of claim 2 wherein said covering comprises a media-containing screen completely covering all sides of said cage.

4. The system of claim 1 wherein each draft tube air supply means comprises an air delivery tube extended through the top surface of an aeration cage and into the aeration cage draft tube; and wherein each air delivery tube is connected to one of said flexible coupling conduits.

5. The system of claim 4 wherein said cage comprises a framework and cross bracing extending from said framework to said draft tube to support said draft tube within said cage; said covering being attached to said framework.

6. The system of claim 5 wherein said covering comprises a media-containing screen completely covering all sides of said cage.

7. A process for secondarily treating waste water liquor comprising the steps of providing a vertical waste water treatment region having an upper turbulent zone, an intermediate mixing zone, a lower settling zone, and a bottom sludge-collecting zone below said settling zone, each extending across the region with said settling zone and said sludge-collecting zone occupying a major portion of said region; providing a plurality of aerating cages within said mixing zone and being in fluid communication with the bottom of said mixing zone and with said turbulent zone, each aerating cage providing a barrier between said turbulent and mixing zones to retain a buoyant media within said mixing zone and prevent such buoyant media from escaping into said turbulent zone; providing a buoyant media in sufficient volume to substantially fill each aerating cage; introducing waste water liquor into said treatment region in said turbulent zone to fill said treatment region up to and including said turbulent zone, and to float said buoyant media into occupancy of said mixing zone, beneath said barrier; introducing air into said cages in sufficient quantity to create a pumping effect of a magnitude that will continuously draw waste liquor from the bottom of said mixing zone, aerate the withdrawn waste liquor portion and expel the aerated portion into said turbulent zone with sufficient force to create turbulence within said turbulent zone, and that will cause waste liquor to pass through said barrier and into and gently downwardly through said mixing zone whereby aerobic microbial growth on said buoyant media will be established; regulating air introduction into said aerating zones to establish a non-turbulent flow rate of waste liquor through said mixing zone sufficient to enable said buoyant media to be self-cleaning but insufficient to wash said microbial growth off said buoyant media; permitting treated waste liquor to settle from said mixing zone into said settling zone in the absence of aeration below said mixing zone; permitting waste liquor portions to settle out from said settling zone into said sludge-collecting zone in the absence of aeration; and drawing off treated waste liquor from with said settling zone.

8. The process of claim 7 wherein initial treatment of said waste liquor is accomplished in a conventional septic tank system with the effluent therefrom constituting the influent to said treatment region; and wherein the effluent from said treatment region is introduced to a septic tank drain field.

9. The process of claim 8 wherein said buoyant media is provided in a form having at least about 38 sq. ft. of surface area per cu. ft. of volume.

10. The process of claim 8 including providing a foam-collecting zone above said treatment region; and wherein sufficient turbulence is created in said turbulent zone that waste liquor in said turbulent zone with foam, enabling additional treatment to occur within the foam thus created and enabling the retention of wastes with the foam until said treatment region can accommodate the retained wastes for further treatment.

11. The process of claim 10 wherein said treatment zone is provided with a tank wherein a cage framework and a media-containing covering is provided for each cage, the upper surface of said covering providing said barrier; and wherein draft tubes are provided and positioned within said cages to define said aerating zones.

12. The process of claim 8 wherein said treatment zone is provided with a tank wherein a cage framework and a media-containing covering is provided for each cage, the upper surface of said covering providing said barrier; and wherein draft tubes are provided and positioned within said cages to define said aerating zones.

13. The process of claim 7 wherein said buoyant media is provided in a form having at least about 38 sq. ft. of surface area per cu. ft. of volume.

14. The process of claim 7 including providing a foam-collecting zone above said treatment region; and wherein sufficient turbulence is created in said turbulent zone that waste liquor in said turbulent zone with foam, enabling additional treatment to occur within the foam thus created and enabling the retention of wastes within the foam until said treatment region can accommodate the retained wastes for further treatment.

15. The process of claim 14 wherein said treatment zone is provided within a tank wherein a cage framework and a media-containing covering is provided for each cage, the upper surface of said covering providing said barrier; and wherein draft tubes are provided and positioned within said cages to define said aerating zones.

16. The process of claim 7 wherein said treatment zone is provided within a tank wherein a cage framework and a media-containing covering is provided for each cage, the upper surface of said covering providing said barrier; and wherein draft tubes are provided and positioned within said cages to define said aerating zones.

17. An aeration cage for a wastewater treatment system comprising a buoyant framework that will float in waste water liquor, a media-containing open mesh covering having a multiplicity of openings therethrough, said covering being supported by said framework and so constructed and arranged to provide a completely enclosed open mesh cage having open mesh top, side and bottom surfaces that will float in wastewater when placed in treatment tank; an air diffuser means including an elongated draft tube mounted to and supported by said framework and means for supplying air into said draft tube, said draft tube extending between the aeration cage top and bottom surfaces and having upper and lower openings, said air diffuser means being so constructed and arranged with respect to said aeration cage that media elements confined with said aeration cage are prevented from escaping the aeration cage and entering said draft tube; a multiplicity of buoyant media elements to support bio-mass contained within said aeration cage that will float in waste water liquor, the mesh size of the cage coverings being small enough to prevent media elements from escaping from their cages and large enough to permit sloughed-off bio-mass to pass through the cage coverings.

18. The system of claim 17 wherein said cage comprises a framework and cross bracing extending from said framework to said draft tube to support said draft tube within said cage; said covering being attached to said framework.

19. The system of claim 18 wherein said covering comprises a media-containing screen completely covering all sides of said cage.

20. A wastewater treatment system comprising a wastewater treatment container means having an inlet and an outlet; a plurality of aeration cages arranged in side-by-side relationship within said container means and air delivery means overlying the aeration cages:

each aeration cage comprising a buoyant framework that will float in waste water liquor, a media-containing open mesh covering having a multiplicity of openings therethrough, said covering being supported by said framework and so constructed and arranged to provide a completely enclosed open mesh cage having open mesh top, side and bottom surfaces that will float in wastewater when placed in treatment tank; an air diffuser means including an elongated draft tube mounted to and supported by said framework and means for supplying air into said draft tube, said draft tube extending between the aeration cage top and bottom surfaces and having upper and lower openings, said air diffuser means being so constructed and arranged with respect to said aeration cage that media elements confined within said aeration cage are prevented from escaping the aeration cage and entering said draft tube; a multiplicity of buoyant media elements to support bio-mass contained within said aeration cage that will float in waste water liquor, the mesh size of the cage coverings being small enough to prevent media elements from escaping from their cages and large enough to permit sloughed-off bio-mass to pass through the cage coverings;

the air delivery means comprising an air delivery manifold extending across the aeration cages; a plurality of flexible coupling conduits, each connected in fluid communication with said air delivery manifold and with one of said draft tube air supply means, whereby air may be supplied from said manifold simultaneously into each draft tube.

21. The system of claim 20 wherein each aeration cage comprises a framework and cross bracing extending from said framework to said draft tube to support said draft tube within said cage; said covering being attached to said framework.

22. The system of claim 21 wherein said covering comprises a media-containing screen completely covering all sides of said cage.

* * * * *